3,462,581
ELECTRIC CIGAR LIGHTER IGNITING UNIT
Robert E. Bristol, Orange, and John L. Boudreau, Stratford, Conn., assignors to Casco Products Corporation, Bridgeport, Conn., a corporation of Connecticut
Filed May 7, 1968, Ser. No. 727,154
Int. Cl. F23q 7/22
U.S. Cl. 219—267        6 Claims

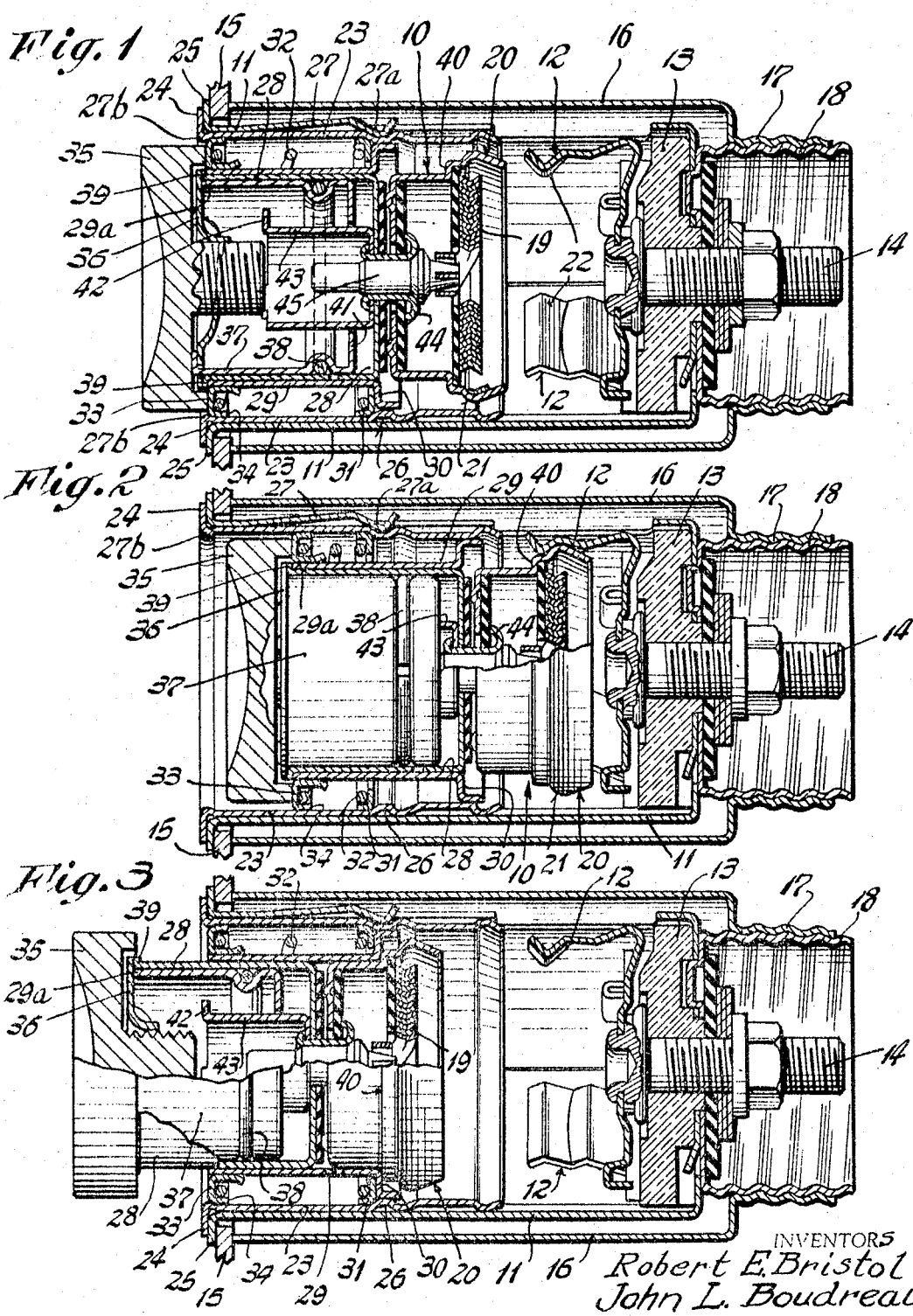

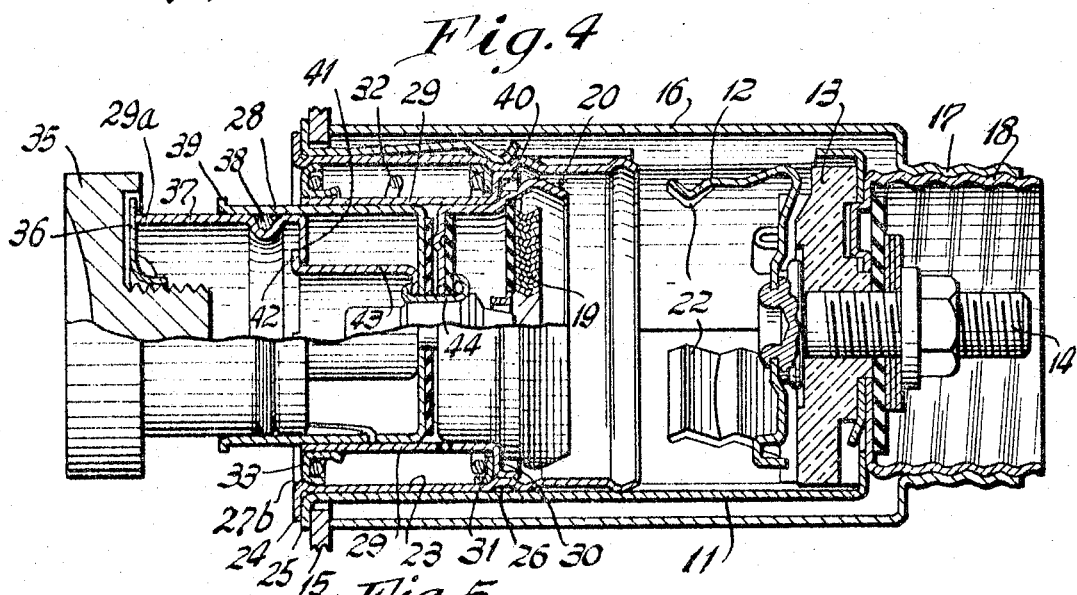
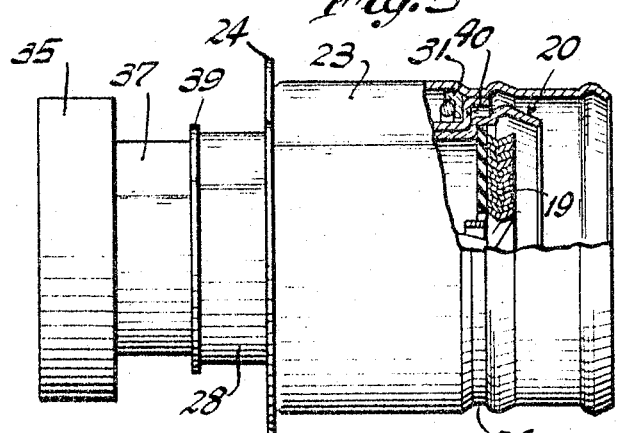
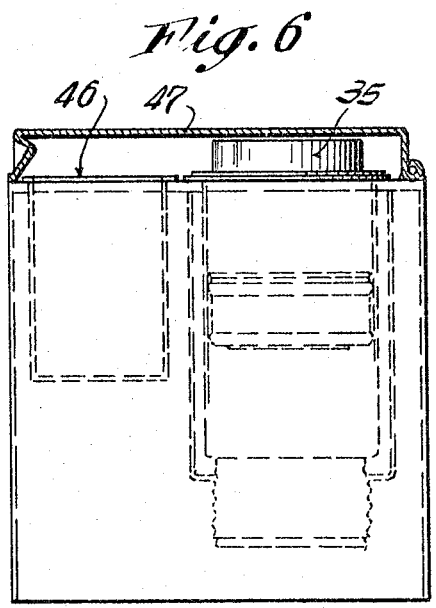
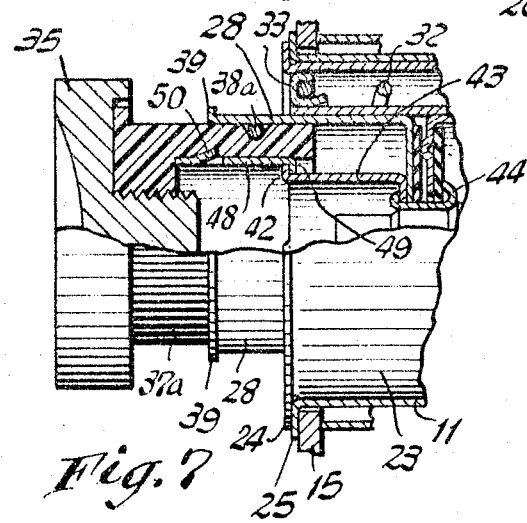

ABSTRACT OF THE DISCLOSURE

An electric cigar lighter igniting unit which is manually removable from a receptacle for use has a knob portion telescopically connected to the heating element carrier so that in storage position and in energizing position in a standard receptacle it does not project from the receptacle sufficiently to be grasped for removal and use, but which, when the heating element is heated and returns to its normal storage position under spring pressure, the knob which is axially movable relative to the heating element carrier and frictionally engaged therewith is moved by its inertia sufficiently beyond the receptacle to be easily grasped for the manual removal and use of the igniting unit.

---

This invention relates to electric cigar lighters such as are installed on the instrument panel and other places in automobiles and other vehicles.

At the present time in commercially produced electric cigar lighters, the handling knob for the igniting unit projects beyond the plane of the panel where it is liable to be accidentally struck by the head of a passenger should the vehicle be stopped suddenly.

Heretofore, it was suggested that the igniting unit and its tubular receptacle be constructed so that in normal storage position the knob does not protrude substantially beyond the plane of the panel in position where it cannot be struck by the head of the person falling downwardly and forwardly. However, as heretofore proposed, it was found necessary to alter the usual tubular receptacle to provide a larger space at the open side of the receptacle to receive the knob when the igniting unit is in storage position. This changing of the receptacle necessitated the substantial enlargement of the hole in the panel to receive the enlarged end of the receptacle.

Because of these changes in the igniting unit, the igniting unit heretofore suggested cannot be inserted and used in the industry standardized receptacles installed in the millions of vehicles now in service, its use being limited to new non-standard installments.

An object of this invention is to provide a cigar lighter igniting unit which can be inserted in the standard receptacle and still have a handling knob which, in storage position, does not protrude substantially beyond the plane of the panel mounting structure for the receptacle. The igniting unit of the present invention may thus be used as a replacement for the usual igniting units by persons concerned with eliminating the hazard of the projecting knob.

At the present time, car manufacturers may purchase the cigar lighter receptacles from one source of supply and the igniting units from another because the dimensions are standardized. It is therefore an important consideration that the igniting units be usable in receptacles regardless of the source of manufacture. Since the igniting units of the present invention may have the same overall dimensions as the presently used igniting units, they can be used as original equipment with the standard receptacles now in use or as replacements.

With automatic cigar lighters of the type referred to, the igniting unit is moved inwardly of the receptacle from a storage position to an energizing position in which it is temporarily restrained, and when the igniting unit is properly heated it is moved by the force of a return spring outwardly of the receptacle to a position in which the igniting unit may be removed for use.

A feature of this invention is the provision of a cigar lighter igniting unit in which the knob, while substantially flush with the instrument panel in the storage position of the unit, is projected substantially beyond the plane of the panel, when the igniting unit has been heated and is released, for manual removal from the receptacle for use.

This is accomplished by providing the knob so as to have frictionally controlled axial telescopic movement relative to the portion of the igniting unit on which it is mounted, so that when that portion of the igniting unit is arrested in storage position the knob may continue to travel to a position where it may be conveniently grasped by the user's fingers to remove the igniting unit as a whole from the receptacle.

After use, the igniting unit is manually replaced in the receptacle in the usual way by pressing inwardly on the knob until the igniting unit is detained in storage position. When this is done, the outer surface of the knob will be substantially flush with the end of the receptacle and the panel on which it is mounted. Should the user replace the igniting unit without applying pressure to the end of the knob so that the latter remains more or less projecting beyond the receptacle, the danger of a person being injured by his head striking the knob is virtually nil because the knob being only retained projected by very slight friction would recede into the receptacle when struck.

Another feature of this invention is the provision of a cigar lighter igniting unit in which the parts which directly cooperate with parts of the standard receptacle may be those currently in use, the parts which are changed or added being simple and capable of being economically manufactured and easily assembled with the preexisting standard parts, such as the receptacle well, the outer sleeve and the heating coil cup contact.

Other features and advantages will hereinafter appear.

In the accompanying drawings:

FIGURE 1 is a longitudinal sectional view of the receptacle and the igniting unit of the present invention with the latter in storage position in the receptacle well.

FIG. 2 is a view similar to FIG. 1 showing the igniting unit in energizing position.

FIG. 3 is a view similar to FIGS. 1 and 2 but showing the heating coil carrier as returned to storage position and the knob partially projected from the receptacle and just about to continue to move to its final position fully projected from the receptacle—the position of the parts being also those assumed during the returning of the igniting unit to storage position.

FIG. 4 is a view similar to FIGS. 1, 2 and 3 but showing the knob fully projected from the receptable, this igniting unit still being supported by the receptacle.

FIG. 5 is an elevation, partly in section, showing the igniting unit per se with the knob fully projected.

FIG. 6 is a fragmentary elevation showing the igniting unit as installed in an ash tray provided with a hinged cover.

FIG. 7 is a fragmentary view of a portion of a cigar lighter showing a modification of the lighter shown in FIG. 1.

From FIG. 1, which is on an enlarged scale, it would appear that the knob projects substantially from the receptacle, but in practice it has been found that a projection of the knob in storage position in the order of ³⁄₃₂″ or 4 mm. is not objectionable.

As shown in the accompanying drawings, the igniting unit 10 is carried by a receptacle comprising a tubular well 11 so as to be removable therefrom for use. At the bottom or inner end of the well there is a plurality of bimetallic latch fingers 12 mounted on an insulating block 13 and connected to an input terminal 14 adapted to be connected to the ungrounded side of a battery for instance. The well 11 extends through a hole in an instrument panel or other support 15 and is secured to and grounded on the latter by a clamping shell 16 having a reduced end 17 in threaded engagement with a threaded cup 18 secured to the well 11 by the input terminal 14.

The igniting unit 10 as shown has on its inner or working end a flat heating coil 19 carried by a heating coil cup 20, the outer end of which has a convex contact surface 21 which cooperates with and is held, when it is desired to heat the coil for use, by similarly curved concave ends 22 of the fingers 12 to be engaged thereby.

The igniting unit 10 also includes an outer sleeve 23 which fits within and has sliding engagement with the receptacle well 11. On the outer end of the sleeve 23 there is a flange 24 which engages a flange 25 on the well 11 which engages the panel 15 and limits the movement of the outer sleeve 23 inwardly of the receptacle. The outer sleeve 23 has an annular depression 26 which engages one or more detent fingers 27 on the well 11 to releasably hold the outer sleeve 23 in storage position in the well 11.

The well 11, outer sleeve 23, fingers 27, heating element coil 19 and its mounting cup 20 have the same dimensions and positions as the corresponding elements in the cigar lighters now in use.

According to the present invention, the heating coil cup 20 is secured bottom to bottom to another cup 28 of the same diameter and which, with the cup 20, fits within and has sliding engagement with an inner sleeve 29. At its inner end the inner sleeve 29 has a flange 30 which has sliding engagement with the outer sleeve 23 and at its outer end the inner sleeve 29 has secured to its a bushing 31 which fits within and has sliding engagement with the outer sleeve 23. It is by means of the flange 30 and the bushing 31 that the inner sleeve 29, cups 20 and 28 and the heating coil 19 are held centered in the outer sleeve for bodily axial movement therein.

Surrounding the inner sleeve 29 is an expansion coil spring 32 having one end in engagement with the inner bushing 31 and the other end in engagement with an outer bushing 33 which has a flange 34 in engagement with the outer sleeve 23. The outer bushing 33 is retained in the outer sleeve 23 by the formation 27b on the sleeve 23. The inner bushing 31 may be loosely placed between the inner and outer sleeves and restrained from movment in one direction by the spring 32 and in the other direction by the inner surface of the annular depression 26 in the outer sleeve 23.

According to the present invention, the igniting unit 10 is manipulated and handled by a knob 35 which, as shown, is threaded into a disk 36 carried by a sleeve 37 which fits within and has sliding engagement with the inner surface of the cup 28 and has a friction ring 38 between itself and the cup 28 resisting casual relative axial movement between the parts.

The disk 36 is of such diameter that it may engage a flange or other protuberance 39 on the end of the cup 28 which in turn engages the end 29a of the inner sleeve 29. Therefore, when the sleeve 37 is pushed inwardly from the storage position shown in FIG. 1 to the energizing position shown in FIG. 2, the disk 36 pushes the cup 28 and the cup 28 pushes the cup 20, the latter carrying the heating coil contact surface 21 into engagement with the contact surfaces 22 of the latch fingers 12 where it is retained until the fingers 12 release the cup 20.

When the inner sleeve 29 is moved inwardly by the protuberances 39 on the cup 28, the coil spring 32 is compressed under tension as shown, the inner end of the spring being in engagement with the bushing 31 which is held relatively stationary in the outer sleeve 23. When the fingers 12 release the cup 20, the spring 32 moves all parts of the igniting unit, except the outer sleeve, toward the storage position. The end 29a of the inner sleeve 29 and the outer bushing 33, being in engagement with the protuberances 39 on the cup 28 and the knob disk 36, respectively, are carried outwardly, as shown in FIG. 3, until the inner sleeve 29 is arrested by the flange 30 engaging the then stationary inner bushing 31, at which time the inner sleeve 29 stops. However, the cups 20 and 28 continue to move by momentum to the left as shown in FIG. 3, until a shoulder 40 on the cup 20 strikes the flange 30 on the inner sleeve 29 as shown in FIG. 3, whereupon the cups 20 and 28 cease to travel. From this position the knob sleeve 37, being restrained from movement solely by the friction ring 38, between it and the arrested cup 28 continues to travel outwardly of the receptacle until it reaches the position shown in FIG. 4 in which an inturn flange 41 on the sleeve 37 engages outturned ears 42 on a cup 43 connected by an eyelet 44 to the cups 20 and 28.

The knob 35 being now accessible for finger gripping and handling as shown in FIG. 4, the entire igniting unit, including the outer sleeve 23, may be pulled from the receptacle for use.

When the igniting unit has been used, and the forward end of the igniting unit has been inserted in the receptacle it is returned to storage position by finger or thumb pressure applied to the knob 35. In being so moved, the protuberance 39 on the cup 28 is brought into contact with the disk 36 on the handle and with the end 29a of the inner sleeve 29 until the depression 26 in the outer sleeve 23 is engaged by the projection on each of the fingers 27, thereby detaining the outer sleeve and the other parts in the position shown in FIG. 1.

When it is desired to prepare the lighter for use, finger or thumb pressure is applied to the knob 35 to move the parts from the position shown in FIG. 1 to that shown in FIG. 2 in which the knob 35 may be completely contained within the outer sleeve.

When the parts are so moved, the coil spring 32 is tensioned because the inner bushing 31 is engaged by the annular depression 26 on the outer sleeve which in turn is engaged with the projection 27a on the spring fingers 27 which remains stationary, the contact surface 21 of the heating coil cup being moved into engaging position with the contact surfaces 22 of the latch fingers 12.

It should be noted that in the position of use shown in FIG. 4, the outer sleeve 23 projects substantially beyond the heating coil to act as a guard to catch any ashes or embers which may fall off a cigar when applied to the heating coil, which sometimes occurs, especially when relighting a cigar.

The frictional connection between the knob 35 and the cup 28 has the further advantage that if during the lighting of a cigar or cigarette there is a sudden change of speed of the vehicle so that the hand of the user jerks toward the users face or vice versa, the heating coil assembly, including the cups 20 and 28, will yield relative to the knob and thereby tend to prevent such jerking motion from causing the cigar or cigarette to be crushed.

As pointed out above, the cups 20 and 28 are secured together by the eyelet 44 but, of course, the cup 20 which engages the live contact fingers 12 is insulated from the eyelet 44 and cup 28 which, through their engagement with sleeves 29 and 23 and detent fingers 27, well 11 and panel 15 are grounded.

The eyelet 44 carries a stud 45 connected to one end (the inner end) of the heating coil 19 while the other end is secured to the contact portion 21 of the cup 20.

It will be observed that the movable parts of the igniting unit are restricted as to their axial relative movements in performing their intended functions. However, they are not restricted against any relative rotation, being coaxial with the axis of the receptacle well. Consequently and advantageously the igniting unit of this invention may be inserted in the well and moved to and from storage position and energizing position without regard to its rotational orientation. In addition, the parts, according to the present invention, being cylindrical may be assembled without regard to their rotational orientation which is a considerable convenience in the manufacture of this igniting unit.

Another advantageous feature of this invention is that, because the knob 35 is substantially flush with the supporting structure, it may be installed in an ash tray (sometimes in the arm rest of passenger vehicles) having a cover fitting closely over the igniting unit. This feature of the invention is illustrated in FIG. 6, in which the top portion of an ash tray 46 is shown as having a hinged cover 47 which may closely overlie the cigar lighter and be swung upwardly to make the knob 35 of the cigar lighter available for manual engagement for energization and removal for use.

FIG. 7 shows a modification of the present invention in which there is substituted for the metallic cup 37 shown in FIGS. 1 to 4 a cup 37a which, as indicated in the drawing, is made of plastic or other material which is a poor conductor of heat and which thereby reduces the possibility of the knob 35, which is frequently made of metal, from becoming uncomfortably hot for any reason. The external diameter of the cup 37a is such as to fit and be slidable in the cup 28 in the same manner as the cup 37 shown in FIGS. 1 to 4.

The cup 37a is also provided with a friction ring 38a to retain it against casual movement relative to the cup 28 and yet permit the cup 37a and knob 35 to move by momentum to the extended position shown in FIG. 7. To restrict the outward movement of the cup 37a, it is provided on its internal surface with a metallic sleeve 48 having an inwardly extending flange 49 positioined to engage the outwardly extending flange 42 of the cup 43. The sleeve 48 is anchored in position in the cup 37a by a tang 50 engaging a recess in the cup.

Variations and modifications may be made within the scope of the claims and portions of the improvements may be used without others.

We claim:

1. An electric cigar lighter having a tubular receptacle and a plug-like igniting unit removable from and replaceable in the receptacle incidental to its use, the igniting unit having a first sleeve (23) slidably engaging the inside surface of the tubular receptacle; a second sleeve (29) within and slidably engaging the first sleeve (23); a third sleeve (28) within and slidably engaging the said second sleeve (29); an expansion spring between and engaging the first sleeve (23) and second sleeve (29); a heating unit (10) mounted on the inner end of the third sleeve (28) and including an electric resistance heater (19) and an electric contact member (20); a fourth sleeve (37) within and slidably engaging the third sleeve (28); a handling knob (35) mounted on said fourth sleeve (37); contact latch fingers (12) mounted on the receptacle to engage and hold the heating unit contact member (20) to energize the heater; means on the said second (29), third (28) and fourth (37) sleeves having abutting means (29a and 39) whereby the igniting unit may, under pressure applied to the knob, be inserted in the receptacle to storage position with the contact member (20) on the heating unit out of contact with the latch fingers (12) and the outer end of the knob substantially flush with the open end of the receptacle, said knob being movable into the receptacle against the tension of said expansion spring to move said heating unit contact member (20) into gripping engagement with said latch fingers (12) to energize the heating unit, said latch fingers being heat-responsive to release said contact member when said heating unit is heated for use whereby under the force of said expansion spring (32) the second sleeve (29) through said abutting means causes the third (28) and fourth (37) sleeves to partially eject from the receptacle; stop means (27b) on the first sleeve (23) and stop means (33) on the second sleeve (29), to arrest the latter at the open end of the receptacle, stop means (30 and 40) on the second (29) and third (28) sleeves respectively to limit the outward movement of the third sleeve, the knob-carrying sleeve (37) being free to continue to move out the third sleeve (28), and stop means (42 and 41) connected to the third sleeve and the fourth sleeve respectively to limit the outward movement of the knob-carrying sleeve to a position where the knob can be gripped by the fingers of the user's hand for removal of the igniting unit from the receptacle for use.

2. An electric cigar lighter according to claim 1 in which friction means are inserted between the third and fourth sleeve to resist casual relative axial movement between the third and fourth sleeve.

3. An electric cigar lighter according to claim 1 in which said heating unit, upon being released by said latch fingers, is caused by said expansion spring to recede within the first sleeve whereby the projecting portion of the latter may serve as an ash guard.

4. An electric cigar lighter comprising a receptacle; an igniting unit comprising a heating unit and a heating unit carrier removably insertable in the receptacle and axially movable in the receptacle between storage and energizing positions, said igniting unit including a handling knob mounted on said carrier for axial movement relative thereto into the receptacle to a position inaccessible for finger-grip engagement when the carrier is moved by the knob into energizing position, friction means for yieldingly holding said knob on the carrier in said inaccessible position, spring means for moving the carrier from energizing position to said storage position, and means for releasably arresting the carrier in storage position prior to its removal from the receptacle for use, said friction means permitting the knob, when the carrier is arrested, to continue to move under its momentum axially of the carrier against the resistance of said friction means substantially beyond the receptacle to position accessible for finger-grip engagement.

5. An electric igniting unit for a cigar lighter having a tubular receptacle within which it is slidably mounted for movement from a storage position to an inner energizing position and for removal for use; an electric resistance heating element; a heating element carrier on the inner end of the igniting unit; a handling knob lying within the receptacle so as to be substantially enclosed by the receptacle in the storage position of the igniting unit; means whereby the knob and the heating element carrier can be moved inwardly of the receptacle from storage position to energizing position; means for retaining the heating element carrier in energizing position until the heating element becomes hot enough for use; means for returning the heating element carrier to storage position when the heating element carrier is released from said retaining means; means for arresting the heating element carrier in storage position; and means for mounting the knob on the heating element carrier for axial movement relative to the latter whereby when the igniting unit is arrested in storage position the knob may continue to move by momentum to a position extending substantially beyond the receptacle where it may be manually grasped for removal of the igniting unit from the receptacle.

6. An electric igniting unit for a cigar lighter of the type having a tubular receptacle having an open outer end, the igniting unit comprising an outer sleeve, an inner sleeve fitting in and slidably engaging the outer sleeve for axial movement relative thereto, an electric resistance heating element, a heating element carrier having a sleeve fitting in and slidably engaging said inner sleeve for axial movement relative thereto, an expansion spring between the inner and outer sleeves, a handling knob having a sleeve fitting in and slidably engaging the sleeve on the carrier for axial movement relative thereto, said knob sleeve, inner sleeve and carrier sleeve having abutting portions whereby movement of the knob against the force of said expansion spring, from a position where its outer extremity is substantially flush with the outer end of the outer sleeve, causes the heating element to project beyond the adjacent end of the outer sleeve and the knob to move farther into the outer sleeve, said expansion spring acting on the carrier sleeve, the inner sleeve and the knob to cause the carrier sleeve and knob to move outwardly of the outer sleeve and the outer movement of the carrier, knob, and knob sleeve to move sufficiently beyond the outer sleeve by its inertia to a position where the knob is accessible for finger-grip engagement.

References Cited

UNITED STATES PATENTS

| | | | |
|---|---|---|---|
| 1,756,013 | 4/1930 | Jackson | 219—266 |
| 2,224,034 | 12/1940 | Lehmann | 219—265 |
| 2,939,940 | 6/1960 | Dening et al. | 219—264 |
| 3,341,687 | 9/1967 | Herwitt et al. | 219—267 |

VOLODYMYR Y. MAYEWSKY, Primary Examiner

U.S. Cl. X.R.

219—265